(12) United States Patent
Luna

(10) Patent No.: US 6,244,356 B1
(45) Date of Patent: Jun. 12, 2001

(54) BALL MARK REPAIR TOOL

(76) Inventor: John Luna, 187 SE. 12th St., Unit 2, Loveland, CO (US) 80537

( * ) Notice: Subject to any disclaimer, the term of this patent is extended or adjusted under 35 U.S.C. 154(b) by 0 days.

(21) Appl. No.: 09/732,427

(22) Filed: Dec. 8, 2000

(51) Int. Cl.[7] .............................. A63B 53/00; A01B 1/04
(52) U.S. Cl. ........................ 172/381; 473/286; 473/408
(58) Field of Search .................................. 473/286, 408; 172/371, 381, 380, 379, 378

(56) References Cited

U.S. PATENT DOCUMENTS

| | | |
|---|---|---|
| 2,082,476 | 6/1937 | Allen . |
| 2,947,556 | 8/1960 | Wenger . |
| 3,771,794 | 11/1973 | Crockett . |
| 3,870,300 | 3/1975 | Amendola . |
| 4,854,592 | 8/1989 | Milovic . |
| 4,862,970 | 9/1989 | Hlavacek . |
| 5,277,425 | * 1/1994 | Petriano, Sr. .................... 172/381 X |

FOREIGN PATENT DOCUMENTS

| | | |
|---|---|---|
| 1423381 | 2/1976 | (GB) . |
| 2119472 | 11/1983 | (GB) . |
| 2202450 | 9/1988 | (GB) . |

* cited by examiner

Primary Examiner—Christopher J. Novosad
(74) Attorney, Agent, or Firm—Ancel W. Lewis, Jr.

(57) ABSTRACT

A repair tool that attaches to the handle end of the shaft of a golf club for repairing golf ball marks on a putting green includes a body with spaced, radially arranged, circumferencial, wedge shaped prongs on a first said. A slotted skirt attached to the second side of the body, in combination with a tapered plug, a bolt and a nut, fits into the shaft and expands outward to tightly attach the tool to the golf club. A cap fits over the prongs to prevent injury to the golfer. A ridge on the prongs fits into an internal groove in the cap to prevent accidental removal of the cap while allowing the cap to be removed when desired.

9 Claims, 1 Drawing Sheet

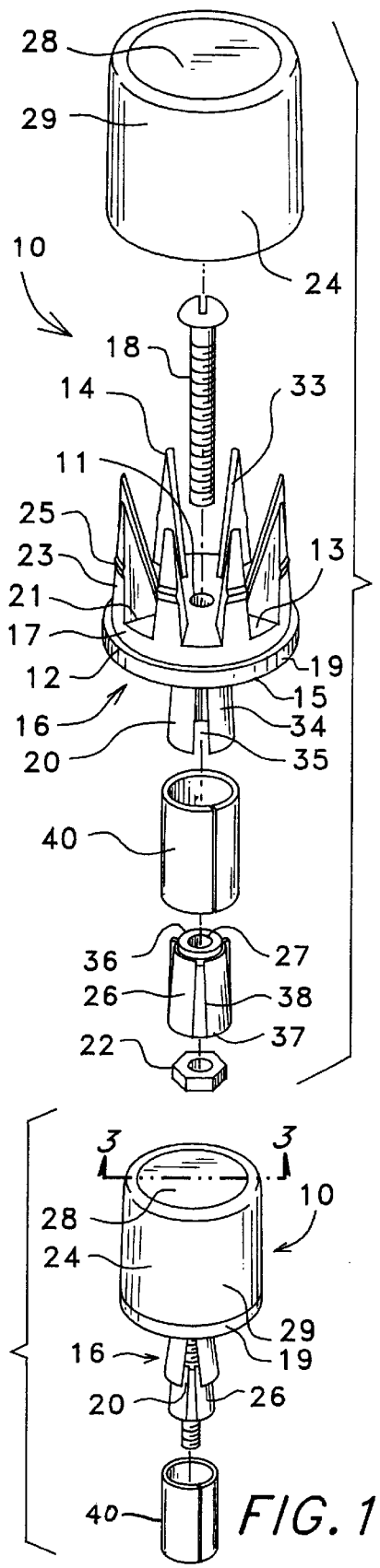
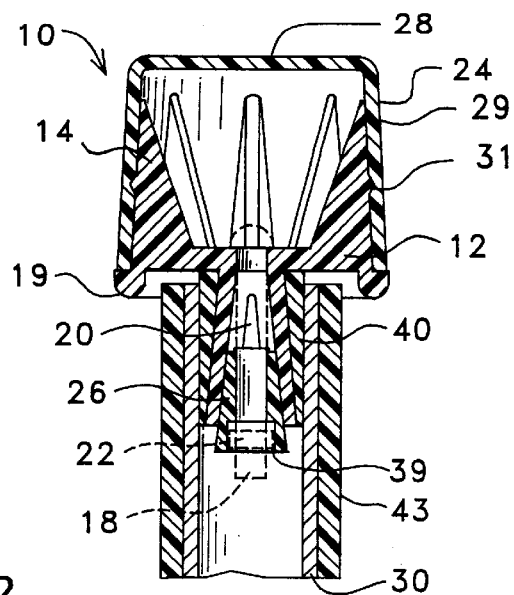
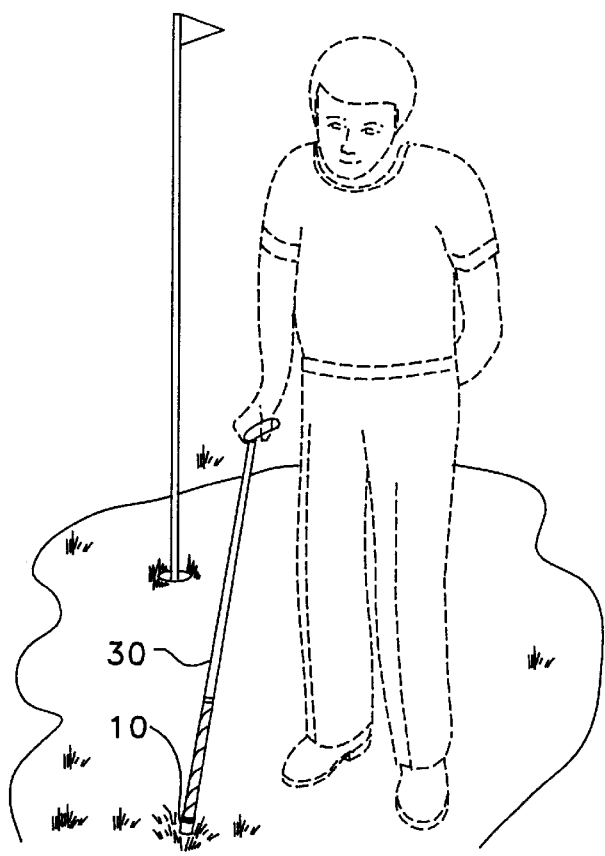

BALL MARK REPAIR TOOL

TECHNICAL FIELD

The present invention relates to the sport of golf and more particularly to a tool for repairing golf ball marks such as those found on a putting green.

BACKGROUND ART

Putting greens on a golf course consist of well groomed turf that is easily damaged. The impact of a golf ball hit onto the green often creates a depression in the green known as a ball mark. Golf etiquette requires each player to repair the ball marks made by the player's golf ball.

The most common prior known tool for ball mark repair is a hand held tool that a player can carry in a pocket or in the golf bag. Generally these hand held tools include two flat, square prongs that are inserted at an angle into the turf under the ball mark and the prongs are used to lever the damaged turf up to the level of the green. These hand held tools require the player to stoop or kneel to repair the ball mark. The player may also forget to bring the hand held device to the golf outing.

U.S. Pat. No. 4,862,970 to Hlavacek discloses a ball mark repair tool that attaches to the handle end of the shaft of a golf club and has two extending flat prongs that are retractable into the shaft of the golf club. This tool works in a manner similar to the above described hand held tools with the prongs being inserted into the turf under the ball mark, and therefore the shaft of the golf club must be nearly horizontal when the tool is used. This tool requires the player to stoop or kneel to repair the ball mark.

U.S. Pat. No. 3,870,300 to Amendola and U.K. Patent No. 2,202,450 to Strachan disclose devices that are attachable to the handle end of a golf club to form a bunker rake. U.S. Pat. No. 4,854,592 discloses a folding device that stows in the shaft of a golf club and can be extended from the handle end of the golf club shaft to form in combination with the golf club a bunker rake.

U.S. Pat. No. 3,771,794 to Crockett discloses a ball mark repair tool that is attachable to the handle end of a golf club. The device of Crockett includes a body with two circumferencially arranged, opposed, spiral curved tines, a resilient tubular bushing, a pliable, folding, cup shaped guard integrally formed to the bushing and a threaded fastener that extends through the body and bushing. The bushing is inserted into the handle end of the shaft of a golf club and the fastener is tightened to compress the bushing along the axis of the shaft, so that the compression expands the bushing perpendicular to the axis of the shaft to lock the bushing in the shaft. The guard is folded back to use the tool. The tool is used by inverting the golf club and inserting the tines into the turf. The shaft of the golf club must be nearly vertical and must be rotated after the tines are inserted into the turf in order to properly repair ball marks with this tool. The pliable guard provides limited protection from injury from the tines since any significant impact to the end of the tool will fold the guard and expose the tines.

DISCLOSURE OF THE INVENTION

A tool, rigidly attachable to the handle end of the hollow shaft of a golf club or to the end of any tubular shaft of similar diameter, for repairing ball marks in a putting green is disclosed. The tool includes a body, means for attaching the tool to the shaft and a detachable protective cap the fits over the body of the tool when the tool is not in use. The body has a base with a first side and a second side, and a plurality of radially arranged, tapered prongs extending from the first side of the base. The means for attaching fits into the interior of the shaft and is attached to the second side of the base. The tool is used by removing the cap, inverting the golf club, holding the golf club at a slight angle to the vertical, and inserting and withdrawing the prongs from the ball mark.

BRIEF DESCRIPTION OF THE DRAWINGS

Details of this invention are described in connection with the accompanying drawings that bear similar reference numerals in which:

FIG. 1 is a perspective view of a ball mark repair tool embodying features of the present invention.

FIG. 2 is an exploded perspective view of the tool of FIG. 1.

FIG. 3 is a sectional view along line 3—3 of FIG. 1 with a shaft added.

FIG. 4 is pictorial diagram illustrating the use of the tool of FIG. 1.

DETAILED DESCRIPTION OF THE INVENTION

Referring now to FIGS. 1, 2 and 3, a ball mark repair tool 10 embodying features of the present invention includes a body 12, a plurality of prongs 14, attachment means 16 for attaching the body 12 to the grip or handle end of the golf club shaft 30, and a protective cap 24. The body 12 includes a first side top 13, a spaced second side bottom 15, a peripheral face 17 connecting the first side 13 to the second side 15, and a first aperture 11 that extends through the body 12 from the first side 13 to the second side 15. The body 12, in the preferred embodiment, is a flat cylindrical or disk shape with a circular peripheral outline, with the first and second sides 13 and 15 being planar and parallel, and the first aperture 11 centered in the first and second sides 13 and 15. The body 12 may have almost any other peripheral outline, such as a closed curve or a polygon, and the first and second sides 13 and 15 also may be concave or convex. A body ridge 19 extends around the peripheral face 17 adjacent to the second side 15.

The prongs 14 each have an elongated base 21, an elongated outer face 23 and an elongated inner face 33, connected together in a triangular configuration. The bases 21 of the prongs 14 are attached to the first side 13 of the body 12 in a spaced radial arrangement. The outer face 23 of each prong 14 aligned with and extends from the peripheral face 17 of the body 12. The inner face 33 extends from the outer face 23 inward and towards the body 12 to the inner extent of the base 21 so that the inner face 33 and the outer face 23 form a wedge. The angle between the inner face 33 and the outer face 23 is elected efficiently repair ball marks as described hereinafter, and is in the range of 10 to 30 degrees. Preferably the angle is about 20 degrees. In the illustrated embodiment the base 21 of each prong 14 tapers inward toward the center of the body 12 and the outer face 23 of each prong 12 tapers inwards from the first side 13. A prong ridge 25 extends across the outer face 21 of each prong 14 parallel to and spaced a selected distance from the body ridge 19.

In the illustrated embodiment the attachment means 16 includes a tubular skirt 20, a plug portion 26, a threaded bolt 18 and a nut 22. The skirt 20 is sized and shaped to fit within the open end of a shaft 30 of a golf club and is attached to the second side 15 of the body 12 around the first aperture 11. The shaft has a grip 43 opposite the club head. The skirt 20 is divided into a plurality, preferably three, skirt portions 34 by longitudinal slots 35. The plug portion 26 is a truncated cone with a small end 36 and a large end 37. The plug portion 26 is sized so that the small end 36 fits into the skirt 20 and the large end 37 is larger than the internal diameter of skirt 20. The plug portion 26 has a second aperture 27 extending from the small end 36 to the large end 37 and plug ridges 38 that are sized and shaped to fit into the slots 35. The large end 37 has a recess 39 around the second aperture 27 that is sized and shaped to receive the nut 22. The attachment means 16 is assembled with the bolt 18 extending the first aperture 11 and the second aperture 27, with the small end 36 of plug portion 26 positioned in the skirt 20, the plug ridges 38 in the slots 35 and the large end 37 of the plug portion 26 away from the body 12, and with the nut 22 threaded onto the bolt 18 against the large end 37 of the plug portion 26.

When the tool 10 is inserted into a hollow shaft 30, the bolt 18 is tightened, drawing the nut 22 and the plug portion 26 toward the body 12. As the plug portion 26 is drawn toward body 12, the taper of the plug portion 26 wedges the skirt portions 35 outward against the shaft 30 to tightly engage the shaft 30. The plug ridges 38 prevent the plug portion 26 from turning and the recess 39 prevents the nut 22 from turning when the bolt 18 is tightened.

Since the internal diameters of golf club shafts vary, the skirt 20 is preferably sized for smaller diameter shafts, a split tubular sleeve 40 sized and shaped to fit around the skirt 20 is placed around the skirt 20 to accommodate and larger diameter shafts. Other attachment means may be used within the scope of the present invention. As an example, and not a limitation, the skirt 20 may be shaped internally so that the nut 22 forces the skirt portions 20 outward as the bolt 18 is tightened and the plug portion 26 would not be used, or a rubber plug with a bolt 18 and nut 22 can be used, without the skirt portions 20 and the plug portion 26, as described above for Crockett.

The cap 24 is generally cup shaped and has an end wall 28 and a side wall 29 attached in a closed curve around the periphery of the end wall 28 and extending transverse thereto. The cap 24 is sized and shaped to fit over the prongs 14 such the side wall 29 contacts the outer faces 23 of the prongs 14 and such that the side wall 29 contacts the body ridge 19 with clearance between the end wall 28 of the cap 24 and the prongs 14. A continuous or endless groove 31 extends in a closed curve around the interior of the side wall 29 to provide releasable attachment of the cap 24 to the body 12 and prongs 14. The groove 31 is sized and shaped to receive the prong ridges 25 and is positioned to engagingly receive the prong ridges 25 when the side wall 29 contacts the body ridge 19. The groove 31 and the prong ridges 25 form an interference fit to securely hold the cap 24 on the repair tool 10 while allowing the cap 24 to be removed when desired.

The components of the tool 10 may be made using any of a number of commercially available plastic or metal materials. The body 12, prongs 14 and skirt portions 20 may be molded as a single part using conventional molding processes. The polycarbonate plastics are an exemplary material for the body 12, prongs 14 and skirt portions 20, and for the cap 24, due to the light weight and high shatter resistance of the material.

FIG. 4 shows the use of the repair tool 10. Typically the repair tool 10 is attached to the handle end of the putter so as that the repair tool 10 is always available when the player is on the green. The repair tool 10 can be attached to the handle end of the shaft of any other golf club or to a separate shaft. The cap 24 is removed first and the club is inverted and held by the club end with the shaft 30 preferably at a slight angle from vertical. As the repair tool is pushed against the green, several of the prongs 14 of the repair tool 10 penetrate into the green and the prongs 14 progressively wedge the soil up around the ball mark to lift the damaged turf up to repair the ball mark. The prongs 14 of the repair tool 10 are withdrawn from the green, the club is turned upright and the cap 24 is replaced on the repair tool 10.

The repair tool 10 of the present invention allows a player to repair ball marks without stooping or kneeling. The repair tool 10 allows a player to repair ball marks without requiring the shaft 30 to be vertical and without requiring the player to twist the shaft 30. When the repair tool 10 is attached to the player's putter, the repair tool 10 is always available when the player is on the green. The cap 24 provides complete protection from accidental injury from the repair tool 10 when the repair tool is not in use.

Although the present invention has been described with a certain degree of particularity, it is understood that the present disclosure has been made by way of example and that changes in details of structure may be made without departing from the spirit thereof.

What is claimed is:

1. A golf ball mark repair tool for attachment to an open end of a tubular shaft of a golf club comprising:

a body having a first side, a spaced second side and a peripheral face, said peripheral face having peripheral body ridge therearound, a plurality of spaced tapered prongs each having an elongated base, an elongated outer face and an elongated inner face arranged in a triangular configuration so that said outer face and said inner face form a wedge, said bases of said prongs being attached to said first side in a spaced radial arrangement with said outer faces extending away from said peripheral face, attachment means, attached to said second side of said body, for attaching said body to said shaft, said attachment means being sized and shaped to fit within said open end of said shaft and radially expandable to frictionally engage the inside of said shaft, and a cup shaped cap having an end wall and a side wall attached around the periphery of said end wall and extending transverse to said end wall, said side wall of said cap being sized and shaped to fit in contact relationship over said prongs and to contact said body ridge to prevent said prongs from contacting said end wall.

2. The tool as set forth in claim 1 wherein said side wall of said cap has a continuous internal groove, and said outer faces of said prongs include prong ridges sized, shaped and positioned to fit into said groove to form an interference fit when said cap is placed over said prongs to securely hold said cap on said prongs while allowing said cap to be removed when desired.

3. The tool as set forth in claim 1 wherein said bases taper inward toward each other.

4. The tool as set forth in claim 1 wherein said outer faces taper inward from bases.

5. The tool as set forth in claim 1 wherein said body has a first aperture extending from said first side to said second side, and said attachment means has a tubular skirt attached to said second side of said body around said first aperture, a truncated conical plug portion with a second aperture therethrough, a bolt and a nut, said skirt being separated into skirt portions by a plurality of slots, said plug portion having a small end and a large end with said small end being sized to fit into said skirt portions to wedge said skirt portions outward when said plug portion is moved toward said second side to press said skirt portions against said shaft, said bolt extending through said first and second apertures and said nut threading onto said bolt and moving said plug portion toward said second side of said body when said bolt is tightened.

6. The tool as set forth in claim 5 wherein said attachment means includes a split tubular sleeve sized to fit around skirt to rigidly attach said body to a larger diameter shaft.

7. The tool as set forth in claim 5 wherein said plug portion includes plug ridges sized and positioned to fit into said slots and said large end includes a recess sized and shaped to receive said nut, said plug ridges preventing said plug portion from rotating when said bolt is turned and said recess preventing said nut from turning when said bolt is turned.

8. The tool as set forth in claim 1 wherein said outer face and inner face form an angle of about twenty degrees.

9. A golf ball mark repair tool for attachment to an open end of a tubular shaft of a golf club comprising:

a body having a first side, a spaced second side, a peripheral face connecting said first and second sides, and a first aperture extending from said first side to said second side, said peripheral face having a body ridge extending around said peripheral face, a plurality of spaced tapered prongs each having an elongated base, an elongated outer face and an elongated inner face arranged in a triangular configuration so that said outer face and said inner face form a wedge, said bases of said prongs being attached to said first side in a spaced radial arrangement with said outer faces extending away from said peripheral face, said bases tapering inward towards each other and said outer faces tapering inward from said bases, said outer faces having a prong ridge spaced a selected distance from said body ridge, attachment means, attached to said second side of said body, for attaching said body to said shaft, said means being sized and shaped to fit within said end of said shaft and radially expandable to frictionally engage said shaft, said attachment means having a tubular skirt attached to said second side of said body around said first aperture, a truncated conical plug portion with a second aperture therethrough, a split tubular sleeve around said skirt, a bolt and a nut, said skirt being separated into skirt portions by a plurality of slots, said plug portion having a small end and a large end with said small end being sized to fit into said skirt portions to wedge said skirt portions outward when said plug portion is moved toward said second side to press said skirt portions against said sleeve and thereby press said sleeve against said shaft, said bolt extending through said first and second apertures and said nut threading onto said bolt and moving said plug portion toward said second side of said body when said bolt is tightened, said plug portion having plug ridges sized and positioned to fit into said slots and said large end includes a recess sized and shaped to receive said nut, said plug ridges preventing said plug portion from rotating when said bolt is turned and said recess preventing said nut from turning when said bolt is turned, and a cup shaped cap sized and shaped to engagingly fit over said prongs, said cap having an end wall and a side wall attached around the periphery of said end wall and extending transverse to said end wall, said side wall being sized and shaped to fit in contact relationship over said prongs and to contact said body ridge to prevent said prongs from contacting said end wall, said side wall having a continuous internal groove, sized, shaped and positioned to receive said prong ridges to form an interference fit when said cap is placed over said prongs to securely hold said cap on said prongs while allowing said cap to be removed when desired.

* * * * *